(12) United States Patent
Knauss et al.

(10) Patent No.: US 8,312,251 B2
(45) Date of Patent: Nov. 13, 2012

(54) COMPANION CHIP FOR A MICROCONTROLLER WITH GLOBAL TIME MANAGEMENT MODULE ENSURING CONSISTENCY AND FIFO MODULE FOR INTERNAL AND EXTERNAL DATA TRANSFER

(75) Inventors: Matthias Knauss, Schorndorf (DE);
Stephen Schmitt, Nuertingen (DE);
Thomas Lindenkreuz, Reutlingen (DE);
Udo Schulz, Vaihingen/Enz (DE);
Juergen Hanisch, Bempflingen (DE);
Rolf Kurrer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 131 days.

(21) Appl. No.: 12/452,923

(22) PCT Filed: Jul. 23, 2008

(86) PCT No.: PCT/EP2008/059646
§ 371 (c)(1),
(2), (4) Date: Apr. 15, 2010

(87) PCT Pub. No.: WO2009/021819
PCT Pub. Date: Feb. 19, 2009

(65) Prior Publication Data
US 2010/0217956 A1    Aug. 26, 2010

(30) Foreign Application Priority Data
Aug. 16, 2007  (DE) .......................... 10 2007 038 542

(51) Int. Cl.
*G06F 15/16* (2006.01)

(52) U.S. Cl. ............................................ 712/32; 712/36
(58) Field of Classification Search .................. None
See application file for complete search history.

(56) References Cited

U.S. PATENT DOCUMENTS
6,892,167 B2 *   5/2005   Polan et al. ................... 702/187

FOREIGN PATENT DOCUMENTS
DE   10 2006 008 631   5/2007
DE   10 2006 008 634   6/2007
EP      1 813 494       8/2007

OTHER PUBLICATIONS
Anonymous: "CIC751 User Manual" Internet Citation, vol. 1.0, Nov. 2005, pp. 1-284.

* cited by examiner

*Primary Examiner* — Kenneth Kim
(74) *Attorney, Agent, or Firm* — Kenyon & Kenyon LLP

(57) ABSTRACT

A companion chip for a microcontroller has a microprocessor bus domain and a peripheral module bus domain, which are connected to each other via a bus bridge. The microprocessor bus domain includes at least one microprocessor core, and the peripheral module bus domain includes at least one global time-management module as well as modules for communication with the outside world and for signal processing. The companion chip further includes at least one FIFO module for transmitting data within the chip, and between the chip and the microcontroller, and a management module connected to the FIFO module, which ensures the consistency of the data by associating a respective time value and/or an angle of rotation.

22 Claims, 3 Drawing Sheets

COMPANION CHIP FOR A MICROCONTROLLER WITH GLOBAL TIME MANAGEMENT MODULE ENSURING CONSISTENCY AND FIFO MODULE FOR INTERNAL AND EXTERNAL DATA TRANSFER

BACKGROUND OF THE INVENTION

1. Field of the Invention

The present invention relates to a companion chip for a microcontroller, and to a method for data processing in such a chip according to Claim 8 and a use of the chip.

2. Description of Related Art

To relieve a microcontroller of today's control systems, a companion chip is often used, which supports the controller in the execution of its tasks. Depending on the purpose of the application of the control system, this requires the subdivision or the partitioning of required functions between the microcontroller and the companion chip. In the engine management of a vehicle, for example, this may be done according to the requirements on speed recording and fuel injection.

A partitioning in a standardized microcontroller and a companion chip may be found, for instance, in the Micronas AutomotivePackage™ multi-chip module (MCM). This module is made up of two parts, the base unit (body unit) and the computing unit (engine unit). The base unit implements the communication with the outside world and contains modules for the programmable voltage supply of the computing unit. The computing unit includes the microcontroller and is adaptable to the application. That being the case, the base unit fulfills the function of an IO (input/output) controller.

In the partitioning of the system for the control system of future control devices of BOSCH, a different procedure is selected. In this instance, partitioning takes place by the specification of mandatory functions of the companion chip, for which mandatory modules for this chip then come about. Speed detection and fuel injection control have already been identified as mandatory functions for the engine control system. Although, partitioning in the current control unit generation of BOSCH is already available in which the PCP (peripheral control processor) and the DMA (direct memory access) are used for low level tasks. In future, though, more functionality is to be transferred to the PCP and later to the companion chip. In particular, this is also necessary since as favorable as possible an interface should be used for the communication between the microcontroller and the chip. Since the latter has a limited bandwidth, as voluminous a signal preprocessing as possible is carried out in the chip, and only a few features are still transmitted between the microcontroller and the chip, for the control algorithms on the microcontroller. Application data for controlling the engine may thus remain on the controller, in order to save storage space on the companion chip and not to increase its cost.

Thus, from the definition of the mandatory functions for the companion chip, a hardware architecture comes about having mandatory modules for the companion chip, which, besides the microprocessor, also implements application-specific hardware for communication with the outside world and for signal processing. However, such a hardware architecture requires the development of an appropriate bus concept, interrupt concept and reset concept which supports this design attempt.

BRIEF SUMMARY OF THE INVENTION

It is an object of the present invention to provide a companion chip for a micro processor which permits a simple and complete mapping of mandatory functions in software and hardware, and which may be produced cost-effectively.

This object is attained by a companion chip including a microprocessor bus domain and a peripheral module bus domain which are connected to each other via a bus bridge, the microprocessor bus domain including at least one microprocessor core and the peripheral module bus domain including at least one global time-management module as well as modules for communication with the outside world and for signal processing, and having at least one FIFO module for the simultaneous decoupled transmission and temporary storage of data within the chip and between the chip and the microcontroller, and a management module connected to it, which ensures the consistency of the data by associating a respective time value and/or angle of rotation.

One essential point of the chip according to the present invention is its partitioning during the requirements on the speed detection and fuel injection control in the engine management of a vehicle, from which there comes about a hardware architecture having a novel internal bus structure, interrupt concept and reset concept. For these two central functions, besides TriCore™-Core, up to the present, peripheral modules PCP, GPTA™ (global purpose timer array), ADC (analog/digital controller) and SSC (synchronous serial channel) have been used. Since more functionalities are supposed to lie in the companion chip for future applications, and, based on the limited bandwidth of the interface between the microprocessor and the companion chip, in fact have to lie there, a microprocessor having application-specific hardware is combined in the companion chip.

In this context, a dedicated DMA component is replaced in the companion chip, since it cannot be used, based on the possibly missing multi-master capability of the processor bus. Because of the application of time and/or angle stamps, the data consistency of the FIFO bus concept, which connects the components in the companion chip, is ensured. In this context, the advantage lies in a simple method which avoids bus collisions and equalizes load peaks on the bus.

According to the present invention, it is provided in one example embodiment that the management module is connected directly to the global time-management module, and is developed for correlating the real time stamps and/or angle stamps of scanning values with respectively requested points in time. Because of the direct connection to the global time bases of the global time-management module, it is possible to correlate real time stamps of the scanning values of the ADC with the requested points in time.

The companion chip is preferably developed for managing ADC resources and for planning scanning inquiries of the signal processing. This makes possible the management of several competing scanning inquiries. The management module executes the scheduling of the individually available ADC resources, in this instance, and simultaneously memorizes the current time stamps for the requests. Thereafter, the scanned ADC values are provided both with the desired time stamp and with the current time stamp, and are passed on to the various signal processing units. The data transfer, in this instance, is made via the FIFO modules of the companion chip.

It is of advantage, in this context, if a programmable signal processor, a filter processor and signal processing units implemented in hardware communicate for signal preprocessing via the peripheral module bus. Based on the special feature regarding the time stamps and/or angle stamps, a special hardware architecture is provided for the signal processing units, using a common peripheral module bus within the companion chip, which suitably supports this boundary condition.

A particularly cost-effective connection of the microcontroller to the companion chip is possible via a serial or parallel peripheral-slave interface. A serial peripheral master interface is preferably provided for controlling external fuel injection IC's. Tasks going beyond a signal preprocessing are made available to the microprocessor, in order to relieve the signal processing units.

The present invention also provides a method for data processing in the companion chip, in which the management module, in the case of competing scanning inquiries, carries out the scheduling of individually available resources.

The method according to the present invention is essentially made possible by the FIFO concept of the companion chip, in which signal propagation times and processing times are taken into account, and the association of angular values and/or time values, for instance, to the ADC measuring vales, are undertaken. The scheduling based on this makes individual resources utilizable in optimal fashion.

According to the present invention, it is provided in one example embodiment that the scanned values be provided with the desired and the current time and/or angular stamps. This makes it possible to correlate real time stamps of the scanning values with the requested points in time. Since the angle clock is also mapped by the global time-management module, angular values may also be associated. Triggers are also possible which are to trigger a measurement of the ADC at certain angle values, such as synchronously with the crank angle, or at certain time values, such as before or after certain events, such as the beginning of fuel injection or the end of fuel injection.

The scanned values are passed on via the FIFO module to the various signal processing modules, in a preferred manner, and are available for evaluation there too.

It is advantageous, in this context, if a measurement of the analog/digital controller module is triggered at certain time values. The latter is usable with respect to this, according to the actual requirements.

The companion chip according to the present invention may be used for controlling the gasoline or Diesel engine of a motor vehicle.

DETAILED DESCRIPTION OF THE INVENTION

Figure 1:
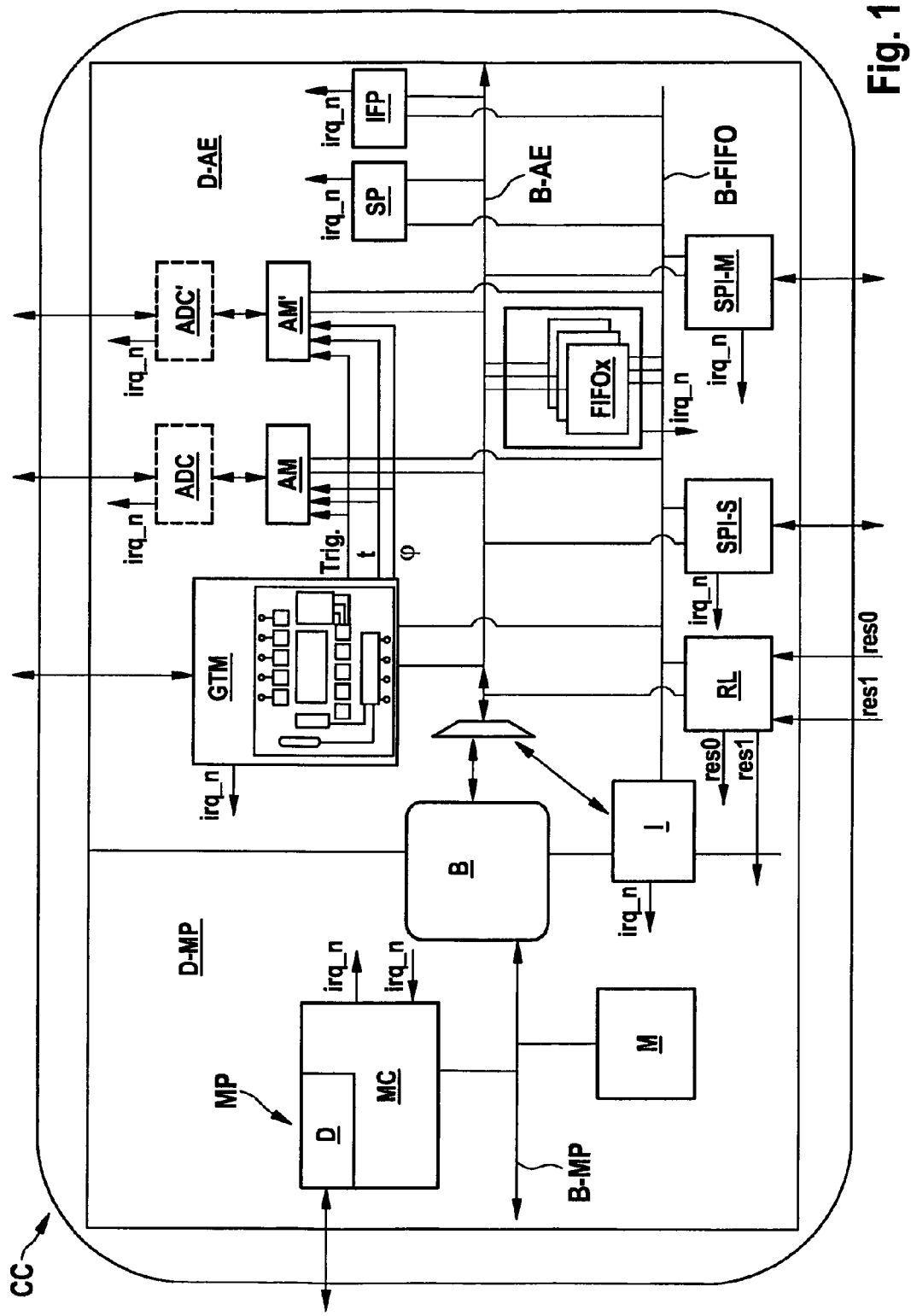
FIG. 1 shows a schematic representation of a companion chip according to the present invention, to clarify its hardware architecture.

FIG. 1 shows a schematic representation of a companion chip CC according to the present invention, to clarify its hardware architecture. The number and the internal structure of the modules is scalable for different engines and classes of vehicle. The figure shows the architecture for a 4-cylinder Diesel engine. Companion chip CC is made up of two bus domains D-MP (domain microprocessor) and D-AE (domain automotive electronics), whose busses B-AE (bus automotive electronics), B-FIFO (bus FIFO) and B-MP (bus microprocessor) are connected to one another via a bus bridge B (bridge). As a result, a microprocessor MP (microprocessor) is able to be exchanged without influencing the hardware architecture in the AE bus domain thereby. Besides a dedicated timing device component GTM (generic timer module), companion chip CC includes, for communication with the outside world, an ADC (analog/digital controller), an SPI (serial peripheral interface), an RL (reset logic), a D (debugger) and, for signal processing, an SP (signal processor) and an IFP (integrated filter processor).

A microcontroller (not shown) is connected via an SPI slave interface SPI-S (SPI slave). Then the control of external fuel injection IC's differs in the Diesel and the gasoline segment. In the case of the Diesel engine, CYx components are used. These are mostly equipped with more intelligence, and are therefore more expensive. They are connected via an SPI master interface SPI-M (SPI master). In the case of gasoline engines, CJx components are used. These are simple IC's (integrated circuits) which require more controlling from the outside. There are connection possibilities for power output stages (H bridges) both via SPI and via MSC (micro second bus). There are differences both as to the number of pins required and the type of transmission. Thus, the SSC (synchronous serial interface)/SPI interface and the timing device generally have four times SPI 1/0 and once timer out, while the MSC interface uses four times output, once input and once CS (control signal), as well as once CS for each further slave. For data transfers within companion chip CC, first-in-first-out modules FIFOx are used. These replace a dedicated DMA component, since the latter is not able to be used, because of the functionality, that may be limited under certain circumstances, of a processor bus B-MP that may, for instance, not be multi-master capable. Rapid interrupt inquiries may be dispatched to processor domain D-MP via an interpreter 1.

As was mentioned above, parts of the signal processing should be carried out in companion chip CC, to reduce the data quantity. This requires various components. A management module AM (administration manager) is used for managing the ADC resources and for passing on the data to the signal preprocessing. The signal preprocessing is then carried out by the programmable signal processor MP, the filter processor IFP and signal processing units SP implemented in hardware. More complex tasks are outsourced to the microprocessor. Based on the special feature regarding the time stamps and/or angle stamps t and $\phi$, which adhere to the data to be processed, a special hardware architecture is provided within companion chip CC, for the signal processing units, which suitably supports this boundary condition.

The microcontroller and companion chip CC have to be supplied with a common clock pulse in order to ensure a frictionless communication via serial interface SPIS, and particularly in order to save on costs for a second time, or timing, device component GTM. In control device EDC16 of BOSCH, a 20 MHz quartz is used. In companion chip CC, two clock domains are to be distinguished, namely microprocessor clock domain D-MP and automobile electronics clock domain D-AE. The clock pulse for the companion chip should amount to 100 MHz. GPTA™ currently runs at 20 MHz, since otherwise the 24-bit time bases overflow too rapidly. An operation of the GTM at 100 MHz is desired. For a fuel injection IC, companion chip CC has to produce a very accurate 8 MHz clock pulse, since otherwise the synchronicity with the internal state computer (state machine) of the IC could possibly not be ensured. For this reason, under certain circumstances, a multiple of 8 should be selected as the clock pulse for companion chip CC.

In the GPTA™, the 4 LTC's (local timer cell array) share one interrupt line. In the GTC's (global timer cell array), 2 GTC's share one interrupt line. In the Leda-Light™, the interrupt resources of the controller are almost completely utilized. In companion chip CC, the interrupt system is constructed hierarchically, microprocessor MP first of all processing interrupts irq_n (interrupt request n) and being able to pass on interrupts irq_n to the microcontroller. Three interrupt lines are available for passing on interrupts to the microcontroller. Interrupt 1 signals arrived data for the fuel injection software of the microcontroller, interrupt 2 signals arrived data for the rotary speed software of the microcontroller and interrupt 3 signals the remaining interrupt sources. Two additional signal lines to the microcontroller are used for coding an interrupt ID for the third interrupt of companion chip CC.

In today's control devices, a voltage supply IC component is used as "with monitoring" (watchdog) for the TriCore™ microcontroller (TC), which carries out an inquiry and response protocol with the microcontroller. If the response is not consistent, a complete reset of the overall system is carried out. The monitoring of companion chip CC may lead to an additional demand on the bandwidth between the microcontroller and companion chip CC.

Companion chip CC is operated using the same reset signal (RSTC) res0, res1 as the microcontroller. The initialization time must be below 200 ms. The initialization phase of the control device is divided into two sections, in this instance, namely interrupts irq_n are switched off and the CAN interface is resumed, and the interrupts irq_n are switched on and the operating system is brought up. The times for the booting process, in this context, include the booting of the TC from the boot ROM using approximately 3.5 ms as well as the startup block and customer block (customer-specific flash program control) using altogether 4 to 5 µs. After that, the starting of the operating system takes place, an init-task which, among other things, resumes the clock pulse for companion chip CC, and a DMA initialization task for a data transfer to companion chip CC that takes place in parallel to the remaining booting process of the TC.

The booting process may be subdivided into four phases for companion chip CC. In a first phase, microprocessor MP of companion chip CC boots out of a boot ROM and first of all initializes the modules required for the communication with the microcontroller. After that, the microcontroller loads the program code for microprocessor MP in burst mode into companion chip CC via the SPI interface, and there it is stored temporarily in FIFO modules FIFOx. The program code of microprocessor MP may grow up to 128 KB. The microprocessor waits for an interrupt which signals to it a full FIFO module FIFOx. Then, in phase three, the interrupt routine loads the memory of microprocessor MP with its program code via bus bridge B of companion chip CC. This presupposes, however, that microprocessor MP is able to access a program memory M in a writing manner. In a fourth phase, microprocessor MP then initializes the remaining modules of companion chip CC for regular operation.

Going into details, the following actions are carried out during the booting phase:

In phase 1 microprocessor MP boots from boot ROM and initializes interpreter 1 and interface SPI-S (baud rate, # data bits 2 . . . 16, MSB/LSB (most significant bit/least significant bit) first, clock pulse polarity idle, high or low, clock pulse data phase shift having active or passive edge, interrupt generation) via peripheral module bus B-AE. In a microcontroller inquiry, a busy code is sent on the SPI-MISO (master in slave out) line.

In phase 2, microprocessor MP initializes a receive FIFO and an interrupt controller via AEI. In case of a microcontroller inquiry, a ready code is sent on the SPI MISO line.

In phase 3, microprocessor MP waits for interrupts for filling microprocessor memory M. A base address is permanently coded in the boot code.

Finally, in phase 4, the microprocessor initializes the remaining modules of companion chip CC, and after the boot process is closed, microprocessor MP signals success or failure to the microcontroller via SPI-S. After that, companion chip CC goes over into application mode.

Figure 2:
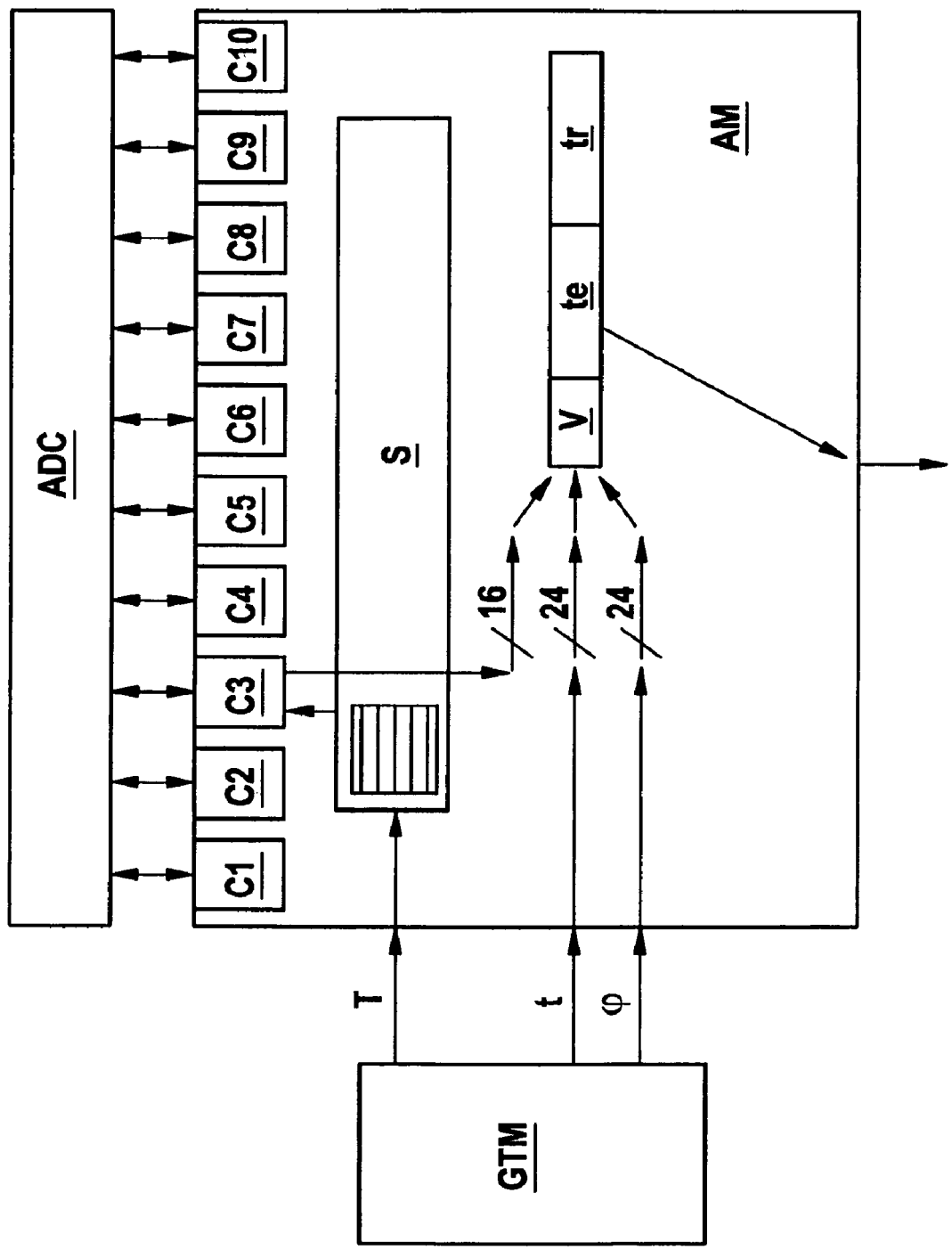
FIG. 2 shows a schematic representation of the management module according to the present invention of FIG. 1, to clarify its manner of functioning.

FIG. 2 shows a schematic representation of the management module according to the present invention, or ADC managers AM of FIG. 1 for the clarification of its manner of functioning. ADC manager AM is responsible for managing the ADC resources and planning S (scheduling) of scanning inquiries of the signal processing of companion chip CC. One special feature of ADC manager AM is the direct connection to the global time bases of time management module GTM. A trigger T is dispatched by GTM and taken up into planning S, to which there is associated an ADC value V (value) and, in this case, the requested point in time to (time expected) and the actual point in time tr (time real) of this value V. This makes it possible to correlate real time stamps tr of the scanning values of the ADC with the requested points in time te. In the case of several competing scanning inquiries, ADC manager AM carries out a sequence planning for the individually available ADC resources, and thereby memorizes current time stamps tr for the inquiries. Thereafter, the scanned ADC values are provided both with the desired time stamp te and with the current time stamp tr, and are passed on to the various signal processing units. The data transfer is undertaken via FIFO module FIFOx of companion chip CC, which is illustrated by the arrow directed downwards. The connection of ADC manager AM to the ADC is implemented via channels C1 to C10.

Figure 3:
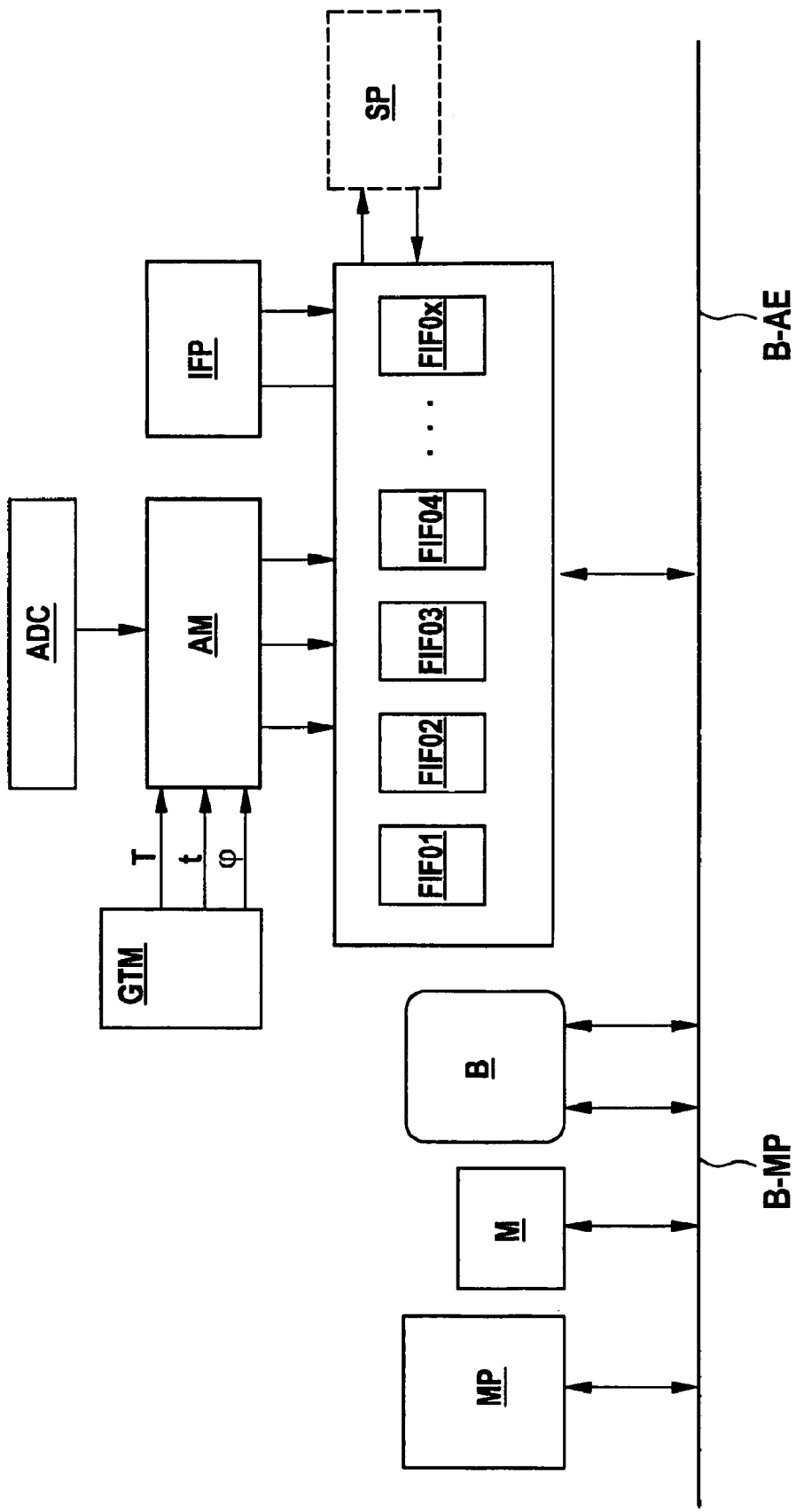
FIG. 3 shows a schematic representation of modules of the companion chip of FIG. 1, to clarify the signal processing via FIFO modules.

FIG. 3 shows a schematic representation of modules of the companion chip CC of FIG. 1, to clarify the signal processing via FIFO modules FIFO1 . . . FIFOx. Modules FIFO1 . . . FIFOx are connected, for one thing, to microprocessor bus B-MP via peripheral module bus B-AE, bus bridge B and microprocessor bus B-MP, and to a program memory M, which is laid out as a RAM. On the other hand, FIFO modules FIFOx are connected to ADC manager AM, to the integrated filter processor and to the signal processor, ADC manager AM being triggered by global time management module GTM, and being provided with time and angular data. These are linked to values of the ADC in the manner already described.

One competing inquiry to an ADC occurs, for example, in CSC-P (combustion signal control-pressure). There, one channel of the ADC is required for each cylinder. Since the high pressure phases are scanned, and these may overlap for different cylinders, competing scanning inquiries are possible. This effect becomes still stronger if there is a higher number of cylinders and for extensions of the scanning provided for the future during the low-pressure phases.

The usage of the resources for the ADC is guided by the signal processing tasks that are to be solved. Since the BIP (begin of injection point) detection and the piezo voltage measurement are mutually exclusive, for a 4-cylinder Diesel engine, in total 12 ADC channels are thus required for the signal processing on companion chip CC. For now, two ADC's may be planned, for example. One ADC takes on tasks having slower conversion times such as CSC-P, BIP detection or piezo voltage measurement, and one ADC takes on the more rapid tasks CSC-K (combustion signal control-knocking) and rail pressure measurement. FIFO modules FIFOx are needed within companion chip CC for three functions. These three functions yield the numbers for the memory usage of the modules.

For the communication between the microcontroller and companion chip CC, three read-FIFO modules FIFOx are accepted at high, low and medium priority. For these modules FIFOx, however, no considerable memory resources are required. Substantial data quantities for the communication between the microcontroller and companion chip CC occur above all at reset. For the system reset, FIFO modules FIFOx may also be used which are required for the signal processing during operation.

Properties of the RAM's (random access memory) are that their size is configurable, that they have an upper and a lower occupancy (upper/lower level watermark), that they have four interrupts, a FIFO flush and a current size of 0.5 KB×32 bits. This gives an overall size for these FIFO modules FIFOx.

The modules described for companion chip CC, its architecture and functionality may be supplied as IP (intellectual property, soft or hard IP) to the manufacturer of a microcontroller, who then implements them on the same silicon as other microcontrollers.

What is claimed is:

1. A companion chip for mapping functions in software and hardware for a microcontroller, comprising:
   a microprocessor bus domain including at least one microprocessor core coupled to a microprocessor bus; and
   a peripheral module bus domain connected to the microprocessor bus domain by a bus bridge, wherein the peripheral module bus domain, coupled to a peripheral module bus, includes: (a) at least one global time-management module; (b) at least one module for communication with external components; (c) at least one module for signal processing; (d) at least one FIFO module for storing and transmitting data among modules on the companion chip and for transmitting data between the companion chip and the microcontroller; and (e) a management module connected to the FIFO module and configured to ensure consistency of a transmitted data by associating at least one of a respective requested time value and a requested rotational angle value with respective at least one of an actual time and an actual rotational angle in response to a trigger;
   wherein the at least one global time-management module provides the management module with the time value, the rotational angle value, and the trigger, and wherein the at least one module for signal processing for receiving scanned values from an analog-to-digital converter (ADC) via the at least one FIFO module for processing the scanned values.

2. The companion chip as recited in claim 1, wherein the management module is connected directly to the global time-management module and configured to correlate at least one of a real time stamp and an angle stamp of a scanning value to a requested point in time.

3. The companion chip as recited in claim 2, wherein the management module is configured to manage analog/digital controller resources and to plan scanning inquiries of signal processing.

4. The companion chip as recited in claim 2, wherein the companion chip includes: a programmable microprocessor containing the at least one microprocessor core; a filter processor and a signal processor for signal preprocessing, wherein the filter processor and the signal processor communicate via a peripheral module bus.

5. The companion chip as recited in claim 2, wherein one of a serial or parallel peripheral slave interface is provided for connecting the companion chip to the microcontroller.

6. The companion chip as recited in claim 2, wherein a serial peripheral master interface is provided for controlling an external fuel-injection integrated chip.

7. The companion chip as recited in claim 4, wherein tasks other than signal preprocessing are performed by the programmable microprocessor.

8. A method for data processing in a companion chip for mapping functions in software and hardware for a microcontroller, the method comprising:
   executing, by a microprocessor using the management module, a scheduling for individually available analog/digital controller resources in the case of competing scanning inquiries of signal processing,
   wherein the companion chip includes: a microprocessor bus domain including the microprocessor having at least one microprocessor core coupled to a microprocessor bus; and a peripheral module bus domain connected to the microprocessor bus domain by a bus bridge, wherein the peripheral module bus domain includes: (a) at least one global time-management module; (b) at least one module for communication with external components; (c) at least one module for signal processing; (d) at least one FIFO module for storing and transmitting data among modules on the companion chip and for transmitting data between the companion chip and the microcontroller; and (e) a management module connected to the FIFO module and configured to ensure consistency of a transmitted data by associating at least one of a respective requested time value and a requested rotational angle value with respective at least one of an actual time and an actual rotational angle in response to a trigger, and
   wherein the at least one global time-management module provides the management module with the time value, the rotational angle value, and the trigger, and wherein the at least one module for signal processing for receiving scanned values from an analog-to-digital converter (ADC) via the at least one FIFO module for processing the scanned values.

9. The method as recited in claim 8, wherein scanned values are provided with requested time values and at least one of current time stamps and angle stamps.

10. The method as recited in claim 8, wherein scanned values are transmitted via the FIFO module to the at least one module for signal processing.

11. The method as recited in claim 8, wherein a measurement of an analog/digital controller module is triggered at a selected time values.

12. The method as recited in claim 8, wherein the method is used for controlling one of a gasoline or Diesel engine of a motor vehicle.

13. The method as recited in claim 8, wherein scanned values are provided with requested time values and at least one of current time stamps and angle stamps, and wherein a measurement of an analog/digital controller module is triggered at a selected time values.

14. The method as recited in claim 8, wherein scanned values are transmitted via the FIFO module to the at least one module for signal processing, and wherein a measurement of an analog/digital controller module is triggered at a selected time values.

15. The companion chip as recited in claim 1, wherein the management module is connected directly to the global time-management module and configured to correlate at least one of a real time stamp and an angle stamp of a scanning value to a requested point in time, and wherein the management module is configured to manage analog/digital controller resources and to plan scanning inquiries of signal processing.

16. The companion chip as recited in claim 15, wherein one of a serial or parallel peripheral slave interface is provided for connecting the companion chip to the microcontroller.

17. The companion chip as recited in claim 15, wherein a serial peripheral master interface is provided for controlling an external fuel-injection integrated chip.

18. The companion chip as recited in claim 15, wherein tasks other than signal preprocessing are performed by the programmable microprocessor.

19. The companion chip as recited in claim 1, wherein the management module is connected directly to the global time-management module and configured to correlate at least one of a real time stamp and an angle stamp of a scanning value to a requested point in time, wherein the companion chip includes: a programmable microprocessor containing the at least one microprocessor core; a filter processor and a signal processor for signal preprocessing, wherein the filter processor and the signal processor communicate via a peripheral module bus.

20. The companion chip as recited in claim 19, wherein one of a serial or parallel peripheral slave interface is provided for connecting the companion chip to the microcontroller.

21. The companion chip as recited in claim 19, wherein a serial peripheral master interface is provided for controlling an external fuel-injection integrated chip.

22. The companion chip as recited in claim 19, wherein tasks other than signal preprocessing are performed by the programmable microprocessor.

* * * * *